(12) United States Patent
Litwin

(10) Patent No.: US 7,055,519 B2
(45) Date of Patent: Jun. 6, 2006

(54) SOLAR COLLECTOR AND METHOD

(75) Inventor: Robert Z. Litwin, Canoga Park, CA (US)

(73) Assignee: United Technologies Corporation, Hartford, CT (US)

( * ) Notice: Subject to any disclaimer, the term of this patent is extended or adjusted under 35 U.S.C. 154(b) by 165 days.

(21) Appl. No.: 10/731,951

(22) Filed: Dec. 10, 2003

(65) Prior Publication Data

US 2005/0126560 A1  Jun. 16, 2005

(51) Int. Cl.
*F24J 2/08* (2006.01)
(52) U.S. Cl. .................. 126/683; 126/600; 126/634
(58) Field of Classification Search ............ 126/683, 126/600, 634, 624, 684, 698
See application file for complete search history.

(56) References Cited

U.S. PATENT DOCUMENTS

| | | | |
|---|---|---|---|
| 1,683,266 A * | 9/1928 | Shipman ................ | 126/683 |
| 4,171,695 A * | 10/1979 | Sletten ................ | 126/683 |
| 4,222,365 A | 9/1980 | Thomson | |
| 4,234,351 A | 11/1980 | Deminet et al. | |
| 4,238,265 A | 12/1980 | Deminet | |
| 4,337,759 A * | 7/1982 | Popovich et al. ........ | 126/684 |
| 4,362,149 A | 12/1982 | Thomson | |
| 4,422,434 A * | 12/1983 | Statz et al. ............. | 126/634 |
| 4,815,443 A | 3/1989 | Vrolyk et al. | |
| 4,947,825 A | 8/1990 | Moriarty | |
| 5,096,505 A | 3/1992 | Fraas et al. | |
| 5,118,361 A | 6/1992 | Fraas et al. | |
| 5,444,972 A | 8/1995 | Moore | |
| 5,850,831 A | 12/1998 | Marko | |
| 5,862,800 A | 1/1999 | Marko | |
| 6,421,845 B1 * | 7/2002 | Bertoni .................. | 126/624 |
| 6,442,937 B1 | 9/2002 | Stone et al. | |
| 6,476,314 B1 | 11/2002 | Bauman et al. | |
| 6,480,366 B1 | 11/2002 | Cordaro | |
| 6,531,653 B1 | 3/2003 | Glenn et al. | |
| 6,532,953 B1 | 3/2003 | Blackmon et al. | |
| 6,557,804 B1 | 5/2003 | Carroll | |

OTHER PUBLICATIONS

Sandia Corporation, *Concentrating Solar Power Overview*—Aug. 28, 2003; eight pages; http://www.energylan.sandia.gov/sunlab/overview.htm.
KJC Operating Company, *Solar Technology*—Aug. 28, 2003; two pages; http://www.kjcsolar.com/solar_2.html.

* cited by examiner

*Primary Examiner*—Alfred Basichas
(74) *Attorney, Agent, or Firm*—Alston & Bird LLP

(57) ABSTRACT

An apparatus and method for collecting solar energy are provided. The apparatus is a trough-type solar collector having one or more mirrors and lenses for directing solar radiation toward a receiver configured to receive a heat transfer fluid therein. The amount of solar radiation directed toward the receiver can be controlled by adjusting one or more of the mirrors and/or lenses or by adjusting a shade. Thus, the collector can direct different amounts or solar radiation toward the receiver, thereby selectively heating the receiver at different rates, e.g., to preheat the receiver, to heat fluid in the receiver for power generation, or to thaw solidified fluid in the receiver. Subsequently, the heated fluid can be used to generate steam and/or electricity.

17 Claims, 10 Drawing Sheets

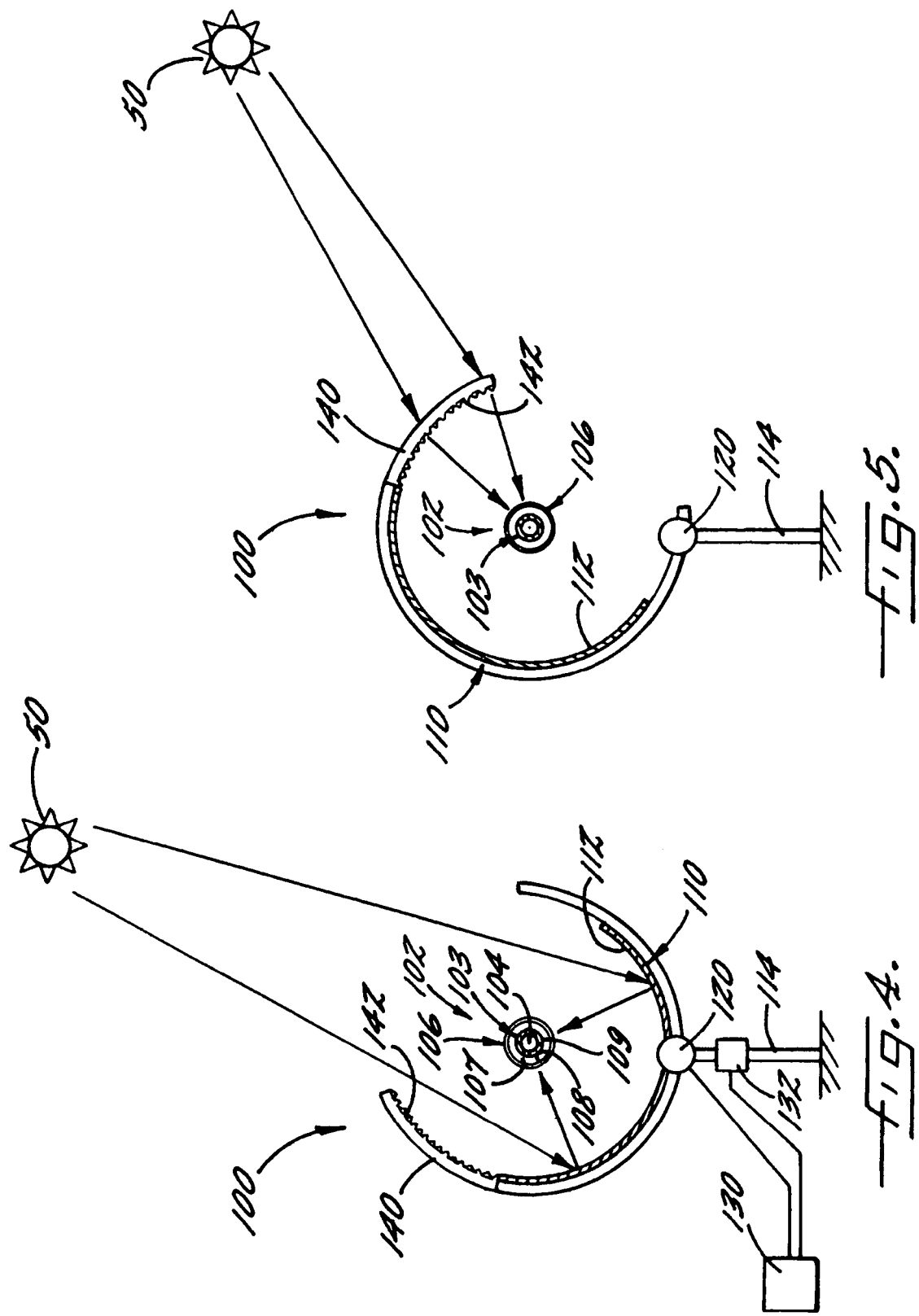

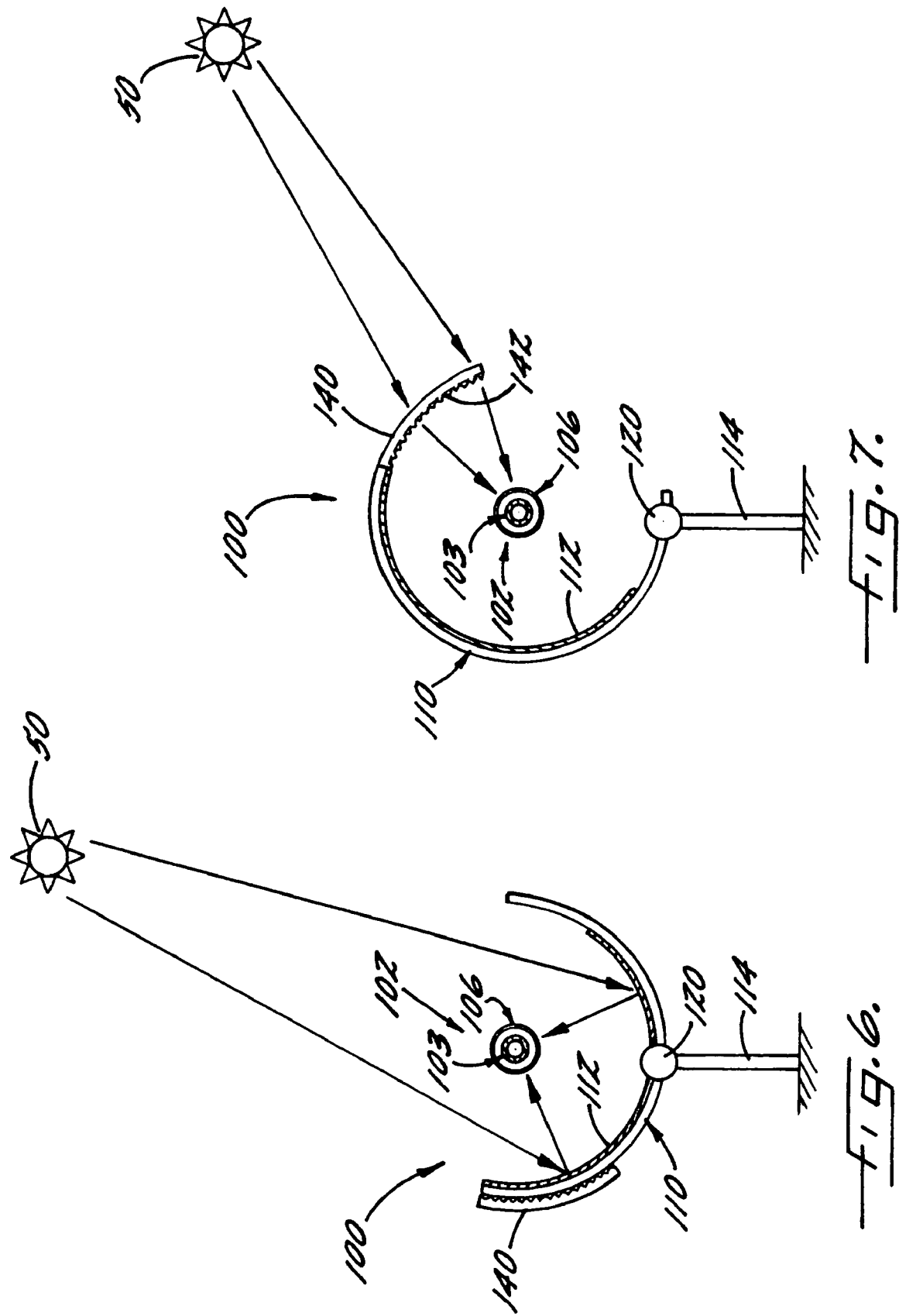

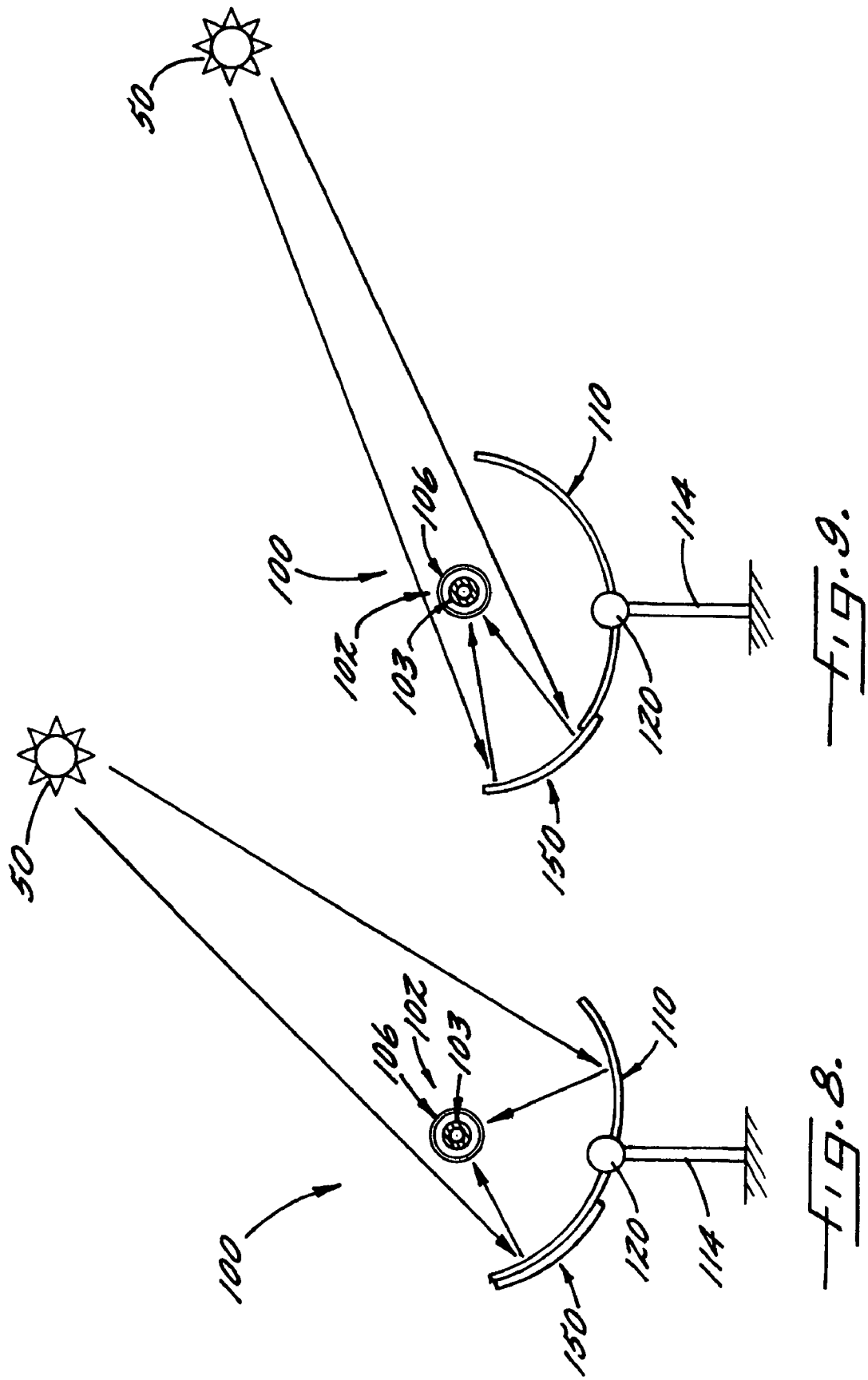

SOLAR COLLECTOR AND METHOD

BACKGROUND OF THE INVENTION

1) Field of the Invention

The present invention relates to the solar energy devices, and, in particular, relates to a trough solar collector that can be used to collect solar energy for power generation.

2) Description of Related Art

In a conventional trough-type solar power generation system 10, as illustrated in FIG. 1, a plurality of parabolic collector mirrors 20 are used to reflect sunlight toward receivers 18 in which a heat transfer fluid is circulated. The fluid, which can be organic or synthetic oil, is circulated by a pump 12 through a fluid circuit 14 that includes the receivers 18 and a plurality of connection pipes 16. After being heated by the collector mirrors 20, the fluid is delivered to a steam generator 22, in which thermal energy is exchanged from the heat transfer fluid to water in a separate fluid circuit 24. Thus, the heat transfer fluid is cooled in the steam generator 22 and can then be re-circulated to the receivers 18 for reheating. Small storage tanks (not shown) may also be included to store the heat transfer fluid. The water heated in the steam generator 22 forms steam that is circulated to a turbine generator 26, i.e., a turbine 28 coupled to an electrical generator 30. The steam expands and rotates the turbine 28 and the generator 30, thus producing electricity. The steam can be passed through a condenser 32 that, in conjunction with a cooling tower 34, condenses the steam to form hot water that is preheated through preheater 33 and can be circulated back to the steam generator 22 by a pump 36 for re-use.

The parabolic collector mirrors 20, shown in FIGS. 2 and 3, typically can be pivoted such that each mirror 20 can be rotated according to a relative position of the sun 50. For example, a motor and drive 40 can rotate the mirrors 20 about the receivers 18. Thus, each mirror 20 can typically be turned "on" by rotating the mirror 20 about the receiver 18 so that the mirror 20 is directed normal to the sun 50 to collect and reflect solar radiation, as shown in FIG. 3. If not directed substantially normal to the sun 50, the mirror is in an "off" position. Due to the parabolic shape, the mirrors 20 do not heat the receivers 18 unless rotated to the on position, where the receivers 18 are in the focal line of the mirrors 20, and a small deviation in rotational position from the on position results in little or no heating of the receivers 18.

At times of relative darkness, such as at nighttime and during cloudy or otherwise overcast weather conditions, sunlight cannot be used for heating the fluid. The circulation of the fluid is typically continued to avoid problems associated with shutdown and/or startup of the system 10. In particular, circulation can be continued to prevent thermal stresses due to temperature mismatch associated with introducing the fluid into the system 10 at a temperature that differs significantly from the temperature of the receivers 18, and other components of the system 10, as can occur during startup. However, if the fluid is continuously circulated when the system 10 is receiving little or no sunlight, the fluid loses thermal energy to the cooler ambient environment. Further, if the temperature of the fluid falls below its freezing point, the fluid will solidify in the receivers 18 and/or the pipes 16. Uniform thawing of the fluid in the fluid circuit 14 can be difficult, and the expansion of the fluid associated with freezing and/or thawing can over-stress, plastically deform, and eventually burst or otherwise destroy the receivers 18, and other components of the system 10. Therefore, in order to maintain the proper temperature of the fluid, the fluid is heated by electric or gas heaters as the fluid circulates around circuit 14, increasing the energy required for operating the system 10, reducing the overall efficiency, and adding pollutants to the environment.

As noted above, the collector mirrors 20 of the trough-type system 10 are configured either in an "on" position in which solar energy is reflected at a maximum rate to the receivers 18 or in an "off" position in which substantially no solar energy is reflected to the receivers 18. Therefore, if the receivers 18 are emptied at the end of each day and refilled at the start of each subsequent day, it can be difficult using the system 20 to match the temperature of the fluid and the receivers 18 during the daily filling operation.

Thus, there exists a need for a solar energy device that can accommodate and heat different types of heat transfer fluids, including those with varied ranges of operating temperature. Preferably, the device should be capable of preheating and/or thawing the heat transfer fluid so that the fluid does not need to be circulated and/or heated continuously during periods of limited sunlight.

BRIEF SUMMARY OF THE INVENTION

The present invention provides an apparatus and method for collecting solar energy. The apparatus is a trough-type solar collector having one or more mirrors and/or lenses for directing and concentrating solar radiation toward a receiver configured to receive a heat transfer fluid therein. The amount of solar radiation directed toward the receiver can be controlled by adjusting one or more of the mirrors and/or lenses or by adjusting a shade. Thus, the apparatus can direct different amounts of solar radiation toward the receiver, thereby selectively heating the receiver at different rates during similar solar conditions, e.g., to preheat the empty receiver, to heat fluid in the receiver for power generation, or to thaw solidified fluid in the receiver.

According to one embodiment of the present invention, the apparatus includes a receiver extending along an axis and defining a passage for receiving a heat transfer fluid. The receiver can be heated with solar radiation that is reflected and focused thereto by a first concave collector mirror extending generally parallel to the receiver, e.g., with the receiver located in the focal line of the mirror. Further, an optical lens or a second mirror positioned adjacent the first mirror and extending generally parallel to the first mirror can be configured to direct solar radiation toward the receiver. Thus, the mirror and lens are configured to direct different amounts of solar radiation toward the receiver such that the receiver can be heated at more than one rate. The first mirror can be parabolic and/or rotatable so that the mirror can receive solar radiation from various directions and direct the solar radiation toward the receiver. The second mirror or the lens can be rigidly attached or adjustable relative to the first mirror. The lens can be, for example, a fresnel lens structured to at least partially refract light passing therethrough.

In embodiments that include a lens, the lens is adjustable between first and second positions. For example, the lens can be fixedly positioned and configured to direct solar radiation from a plurality of directions toward the receiver, and an adjustable shade can be provided to controllably prevent the transmission of solar radiation toward the receiver and thereby control the amount of heating of the receiver. Alternatively, the lens can be rotatable about a longitudinal axis of the receiver so that the lens can direct solar energy from the sun toward the receiver throughout a range of relative positions of the sun. In the first position the lens directs solar radiation toward the receiver to thereby heat the heat transfer fluid in the passage at a first rate, and in the second position the lens directs a lesser amount of solar radiation toward the receiver than in the first position to thereby heat the receiver at a second rate less than the first rate.

The present invention also includes a method of heating a heat transfer fluid using solar energy. The method includes circulating the heat transfer fluid through a receiver defining a passage. A solar collection apparatus is adjusted between first and second positions. According to one embodiment of the invention, the first position is characterized by a mirror configured to reflect solar radiation toward the receiver, and the second position is characterized by a second mirror or an optical lens being positioned adjacent the first mirror to direct a different amount of solar radiation toward the receiver. The second mirror or the lens can be adjusted by rotating the first mirror, or by adjusting the second mirror or lens relative to the first mirror.

According to another embodiment of the present invention, the heat transfer fluid is circulated through the receiver and a solar collection apparatus is adjusted between first and second positions. In the first position, a lens of the apparatus is configured to direct, i.e., by refracting and concentrating, solar radiation toward the receiver and heat the heat transfer fluid therein. In the second position, the lens is configured to direct a second, lesser amount of solar radiation toward the receiver. The apparatus can be adjusted by rotating the lens about the receiver according to a relative position of the sun, and/or by adjusting a shade device to at least partially prevent the transmission of solar radiation toward the receiver.

The receiver can be preheated before the fluid is introduced and circulated by directing solar energy thereon while the receiver is in a substantially empty condition. Further, fluid that is inadvertently solidified in the receiver can be melted. The heat transfer fluid, which can be a molten salt, can also be delivered to a power generator.

BRIEF DESCRIPTION OF THE SEVERAL VIEWS OF THE DRAWINGS

Figure 1:
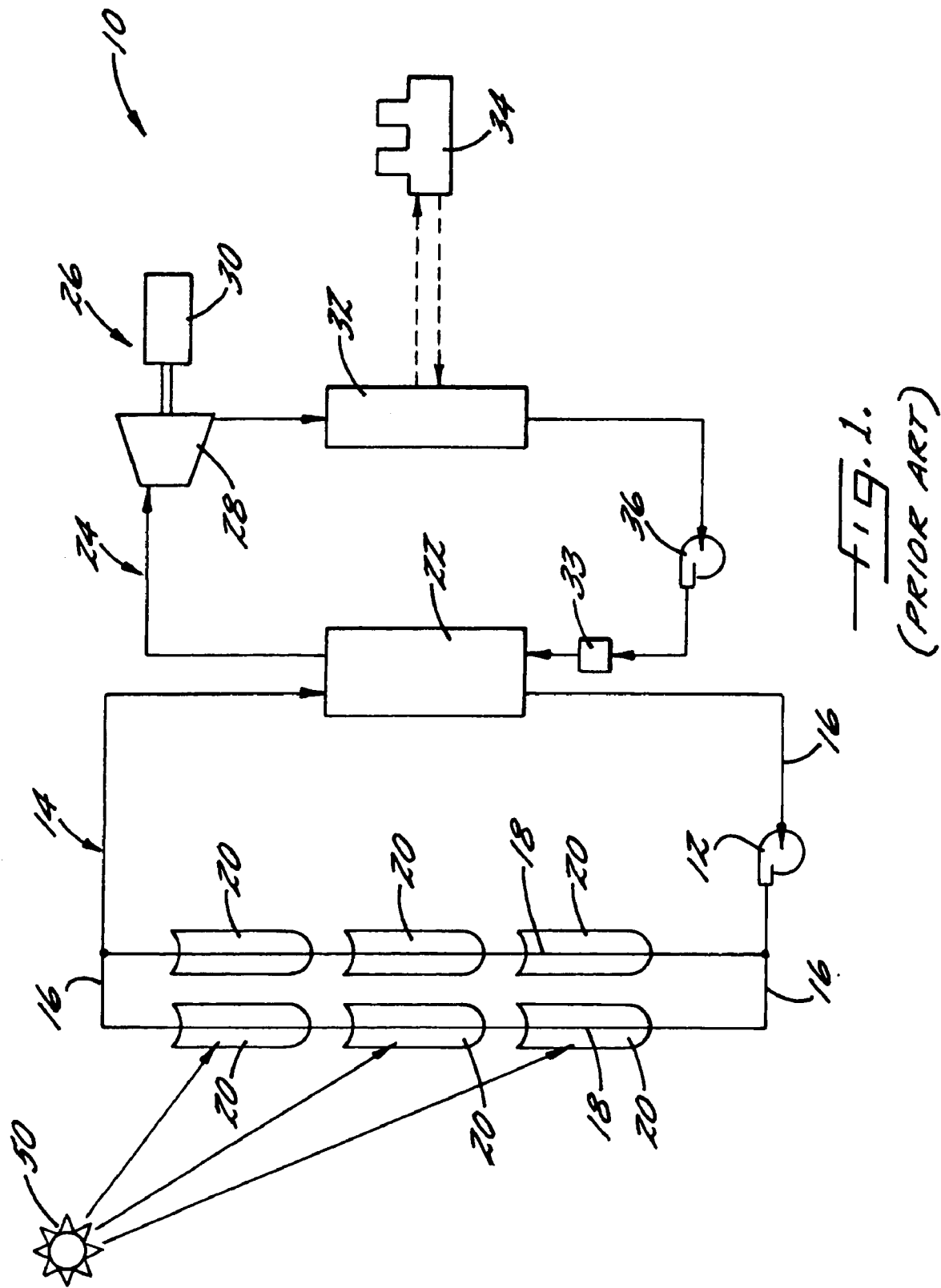
Figure 2:
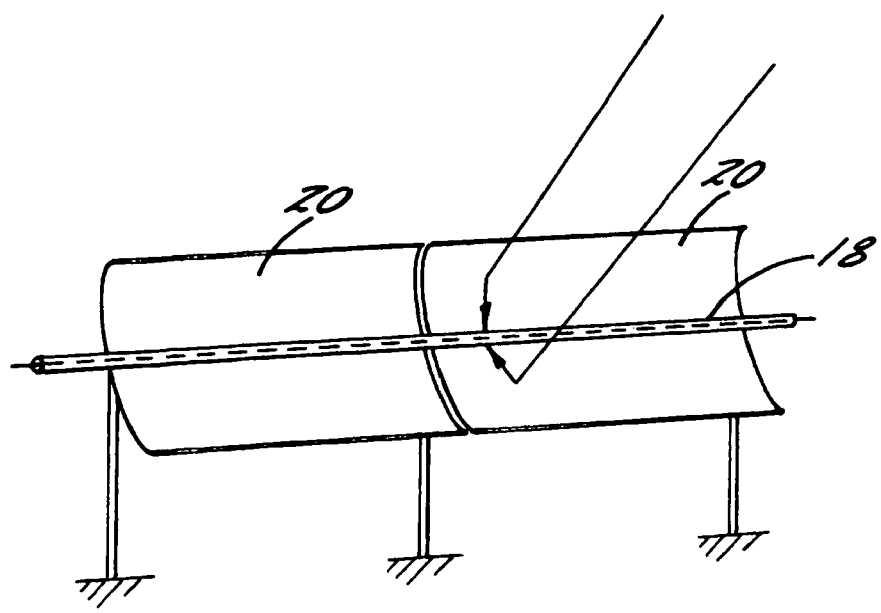
Figure 3:
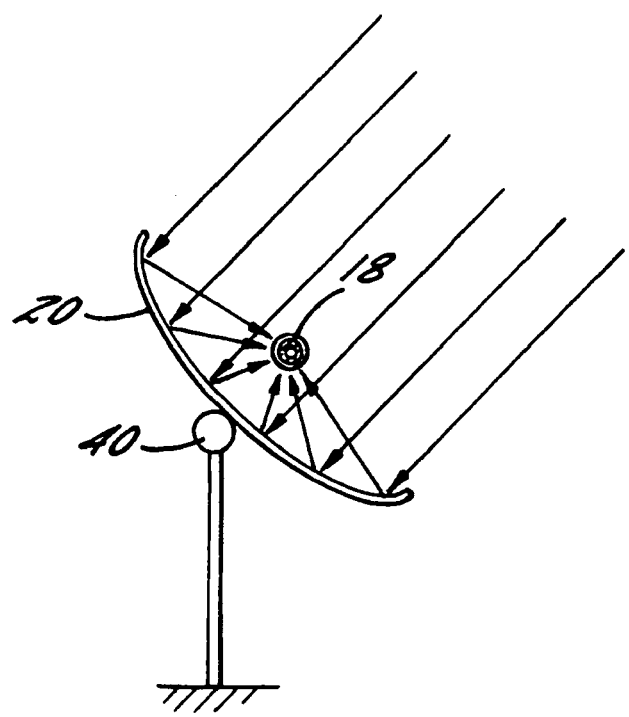
Figure 10:
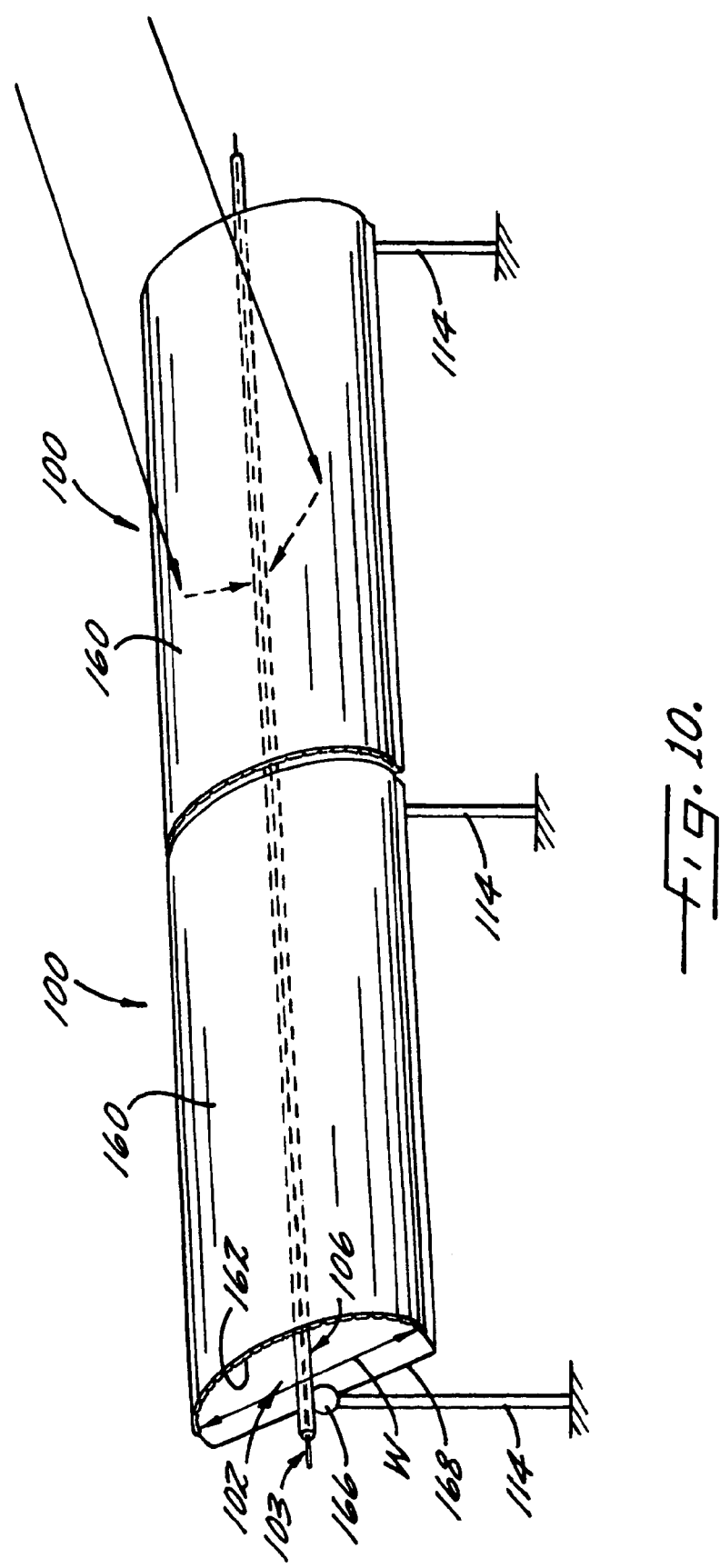
Figure 11:
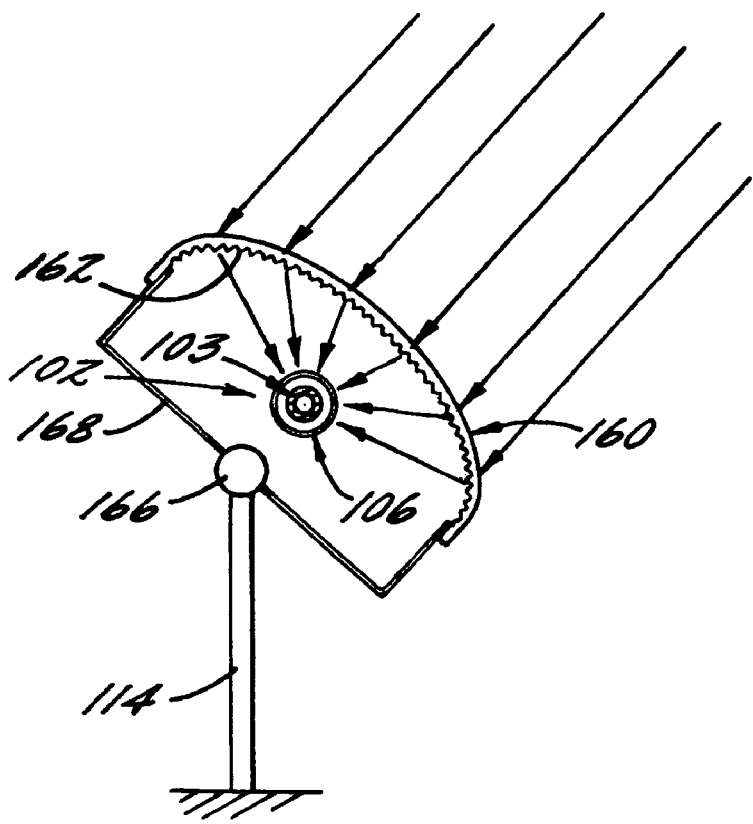
Figure 12:
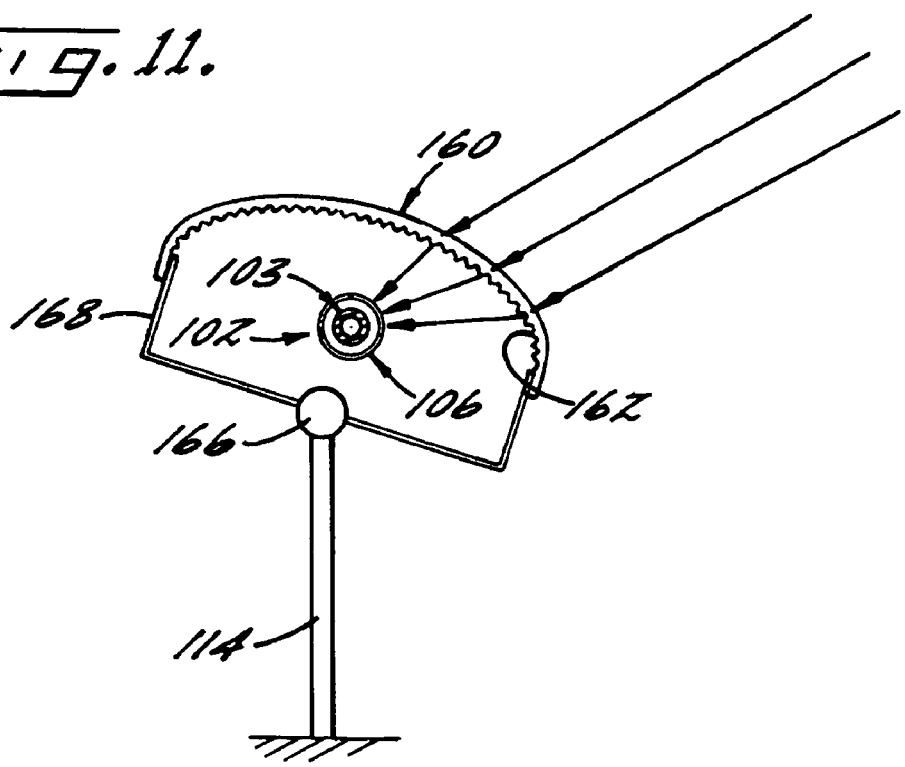
Figure 13:
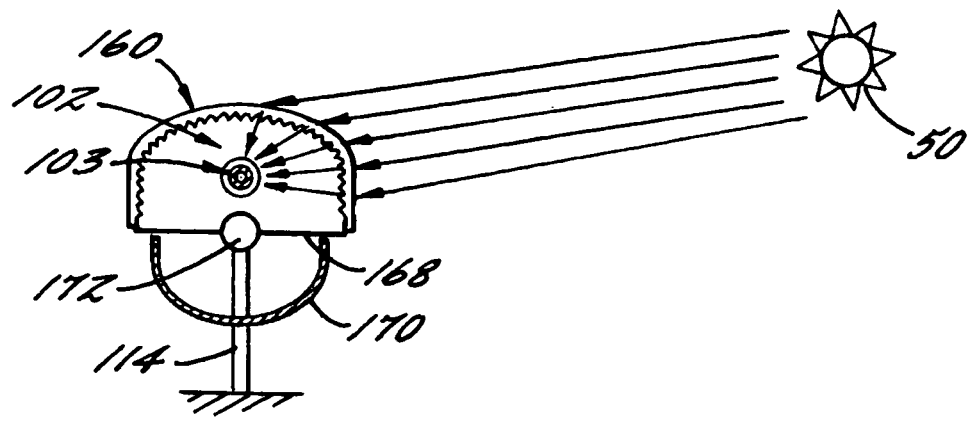
Figure 14:
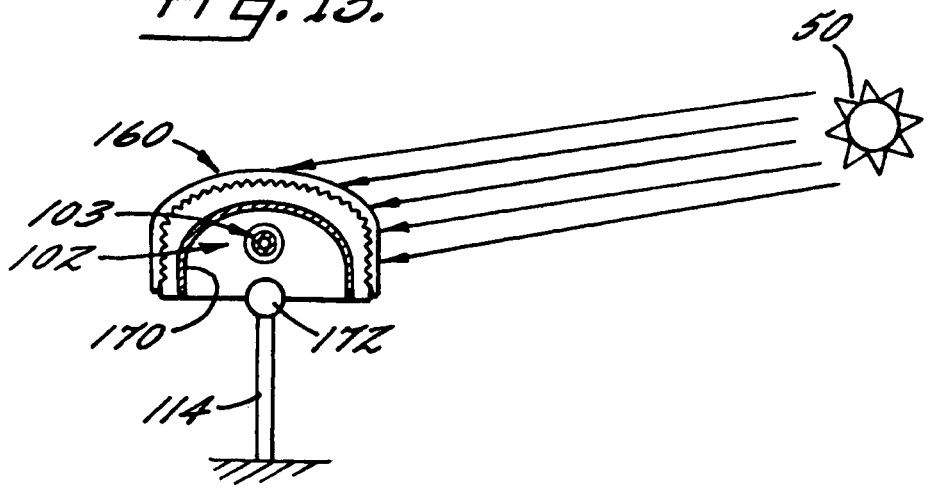
Figure 15:
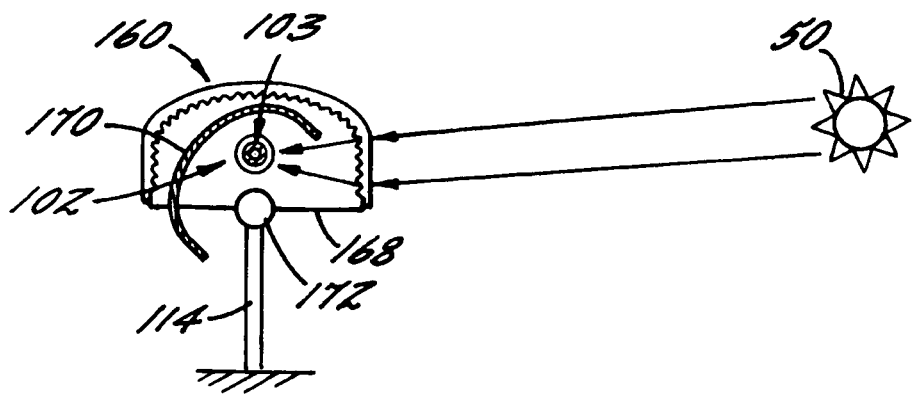
Figure 16:
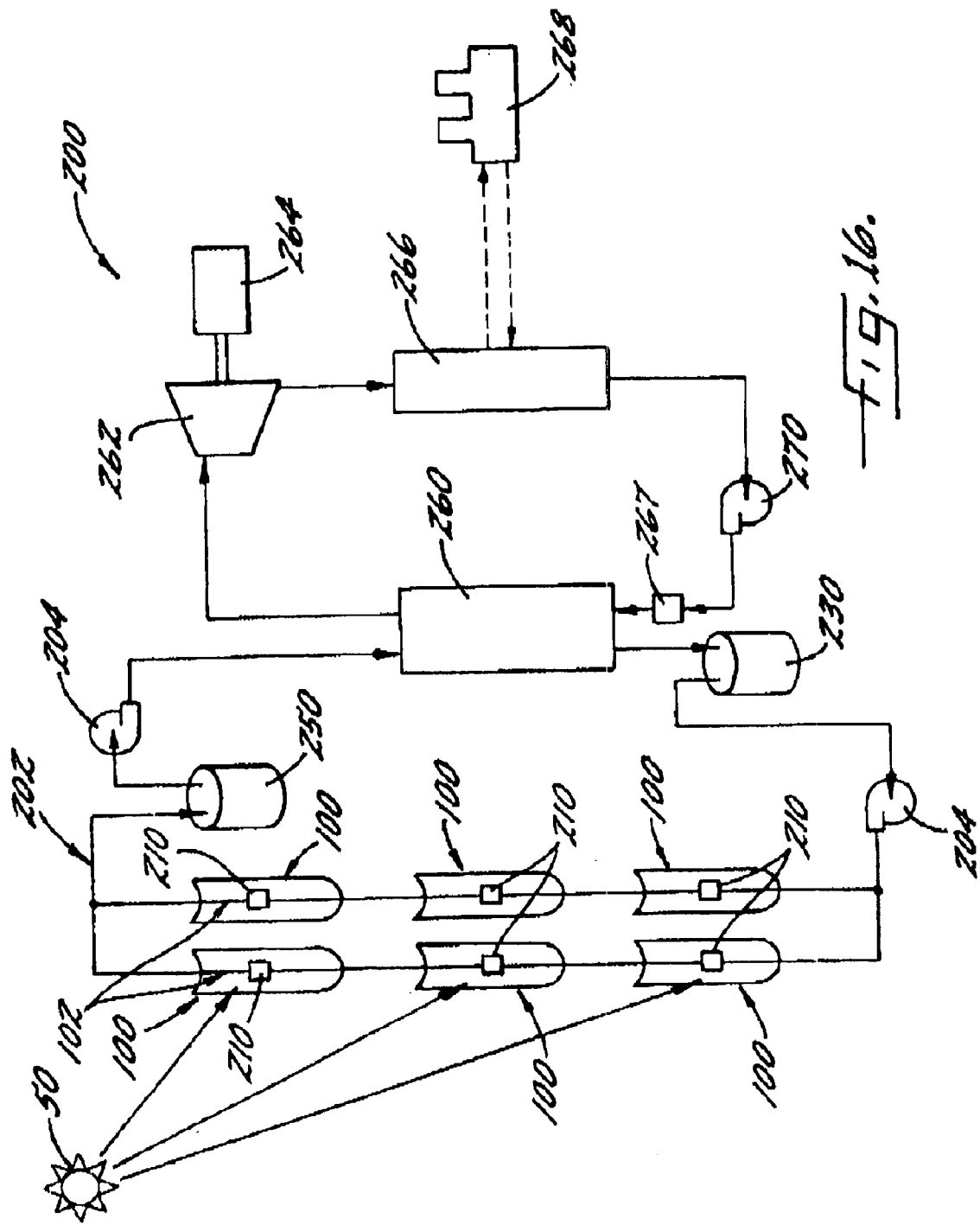
Figure 17:
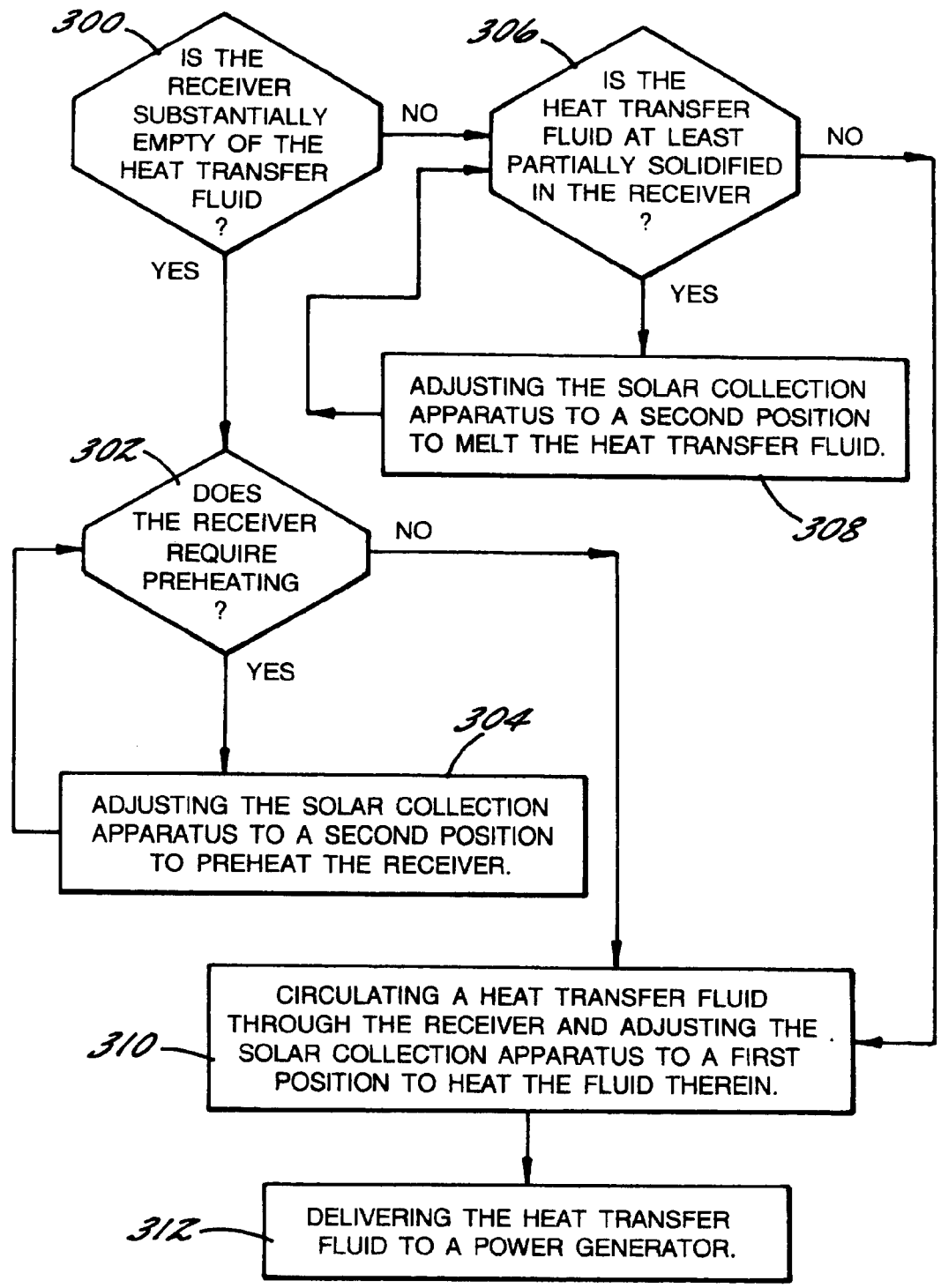

Having thus described the invention in general terms, reference will now be made to the accompanying drawings, which are not necessarily drawn to scale, and wherein:

FIG. 1 is a schematic view illustrating a conventional trough-type solar power plant;

FIG. 2 is schematic view in perspective illustrating a conventional trough-type solar collector;

FIG. 3 is a schematic view in elevation illustrating the solar collector of FIG. 2;

FIG. 4 is a schematic view in elevation illustrating a solar collector including a lens according to one embodiment of the present invention, shown in a first position;

FIG. 5 is a schematic view in elevation illustrating the solar collector of FIG. 4, shown in a second position;

FIG. 6 is a schematic view in elevation illustrating a solar collector including an adjustable lens according to another embodiment of the present invention, shown in a first position;

FIG. 7 is a schematic view in elevation illustrating the solar collector of FIG. 6, shown in a second position;

FIG. 8 is a schematic view in elevation illustrating a solar collector including two mirrors according to another embodiment of the present invention, shown in a first position;

FIG. 9 is a schematic view in elevation illustrating the solar collector of FIG. 8, shown in a second position;

FIG. 10 is a schematic view in perspective illustrating a solar collector according to yet another embodiment of the present invention;

FIG. 11 is a schematic view in elevation illustrating the solar collector of FIG. 10, shown in a first position;

FIG. 12 is a schematic view in elevation illustrating the solar collector of FIG. 10, shown in a second position;

FIG. 13 is a schematic view in elevation illustrating a solar collector according to still another embodiment of the present invention, shown in a first position;

FIG. 14 is a schematic view in elevation illustrating the solar collector of FIG. 13, shown in a second position;

FIG. 15 is a schematic view in elevation illustrating the solar collector of FIG. 13, shown in a third position;

FIG. 16 is a schematic view illustrating a solar power system according to one embodiment of the present invention; and FIG. 17 is a block diagram illustrating the operations for collecting solar radiation according to one embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to FIG. 4, there is shown an apparatus 100 for collecting solar energy. The apparatus 100 is structured as a trough-type solar collector, which includes a receiver 102 such as a pipe, tube, or other fluid conduit or vessel that defines a passage 104 for receiving and heating the heat transfer fluid. The apparatus 100 also includes a concave collector mirror 110 with a reflective surface 112 that is directed toward the receiver 102 and configured to reflect solar radiation toward the receiver 102 to heat the heat transfer fluid therein. A longitudinal axis of the mirror 110 can extend generally parallel to an axis of the respective receiver 102, and preferably the mirror 110 has a cross-sectional shape that is parabolic or nearly parabolic so that light entering from a particular direction is concentrated and reflected onto the receiver 102, which is located at a focus of the mirror 110. The mirror 110 can alternatively define other concave shapes for concentrating and reflecting light to the receiver 102.

The size of the receiver 102 can correspond to the flow and heat requirements of the apparatus 100 and a trough system in which the system is used. The receiver 102 can be larger, smaller, and define a larger or smaller area as required by the system. For example, in some embodiments, the receiver 102 can be less than about 1 inch in diameter. The receiver 102 can be formed of a variety of materials, preferably a material that can be operated for extended periods of time at temperatures of up to about 1100° F.

The receiver 102 typically includes a metal tube 103 in which the heat transfer fluid is circulated and a glass tube 106 that extends concentrically around the metal tube 103. A space 107 is defined between the inner surface 108 of the glass tube 106 and the outer surface 109 of the metal tube 103, and the space 107 can be evacuated to increase the effective insulation of the receiver 102. Solar radiation reflected from the mirror 110 is transmitted through the glass tube 106 to impinge on the metal tube 103. The evacuated space 107 and, hence, the glass tube 106, reduces the loss of heat from the metal tube 103 to the ambient environment due to conduction and convection therefrom. Further, the metal tube 103 can be painted or otherwise coated to increase the absorption of solar radiation. For example, the metal tube 103 can be spray painted with black or other dark paint to increase the thermal absorptivity thereof on the surface 109.

The collector mirror 110 can be supported by a base frame 114 or other structure, and can be adjustable relative to the frame 114. The mirror 110 can be rotatably adjustable so that the mirror 110 can be rotated about the receiver 102 according to the relative position of the sun 50. For example, a drive mechanism and motor 120 or other actuator can be provided for rotating the mirror 110. The drive mechanism and motor 120 can be controlled by a controller 130, such as a computer, programmable logic device, or the like. The controller 130 can communicate with a sensor 132 or detector that determines the relative position or direction of the sun 50, or the controller 130 can be pre-programmed with a schedule of the position of the sun 50 such that sensing the position of the sun 50 is not required. Thus, the mirror 110 can be adjusted continuously throughout various positions, e.g., so that the mirror 110 is kept substantially perpendicular, i.e., aligned or normal, to the direction of the sun 50 and the solar radiation is reflected onto the receiver 102, which is maintained at the focal line of the mirror 110. Further, if multiple mirrors 110 are used for a single receiver, or multiple collection apparatuses 100 are used for a single solar power generation system, each mirror or set of mirrors can be controlled independently so that each receiver is heated as desired.

The apparatus 100 can also include an optical lens 140 for directing solar radiation onto the receiver 102. As shown in FIG. 4, the optical lens 140 can be rigidly connected to one side of the mirror 110 so that the lens 140 is rotated with the mirror 110. As positioned in FIG. 4, the mirror 110 reflects light onto the receiver 102 to heat the receiver 102. In another position, shown in FIG. 5, the mirror 110 and the lens 140 are rotated such that the lens 140 is configured to intercept and direct solar radiation onto the receiver 102, i.e., the lens 140 is disposed between the receiver 102 and the sun 50. Thus, the mirror 110 and the lens 140 can each be configured to heat the receiver 102 in the respective positions.

The lens 140 can be any of a variety of optical devices and can be formed of materials including glass, polymers, and the like. According to one advantageous embodiment of the present invention, the lens 140 can be a fresnel lens, i.e., a relatively thin lens defining a plurality of grooves 142 on at least one of the surfaces. Fresnel lenses are available from a number of manufacturers including 3M Company of St. Paul, Minn. In some cases, the fresnel lens can be provided as a sheet or film of material that is cut and configured in the desired shape.

According to another aspect of the invention, the lens 140 can be adjustable relative to the mirror 110 so that the lens 140 can be retracted or otherwise stowed when not in use. For example, as shown in FIG. 6, the mirror 110 is configured to reflect solar radiation onto the receiver 102, and the lens 140 is shown in a stowed position relative to the mirror 110. Preferably, when the lens 140 is adjusted to the stowed position, the lens 140 does not interfere with the reflection of solar radiation by the mirror 110 to the receiver 102. When it is desired to use the lens 140 for directing solar radiation onto the receiver 102, the lens 140 can be adjusted to an extended position as shown in FIG. 7. For example, an actuator such as a motor (not shown) can adjust the lens 140 relative to the mirror 110. Further, the mirror 110 and the lens 140 can both be adjusted by the motor 120 so that the lens 140 is disposed between the sun 50 and the receiver 102 and directs and concentrates solar radiation onto the receiver 102.

The lens 140 can be configured to direct less solar energy onto the receiver 102 than the mirror 110. Thus, the lens 140 and mirror 110 can be used to heat the receiver at different rates as desired during similar solar conditions. For example, during a condition characterized by a particular amount of solar radiation, the mirror 110 can be used to heat the receiver 102 at a relatively greater rate, or the lens 140 can be used to heat the receiver 102 at a relatively lesser rate.

The apparatus 100 can alternatively include a first mirror 110 and a second mirror 150 as shown in FIGS. 8 and 9. The first mirror 110, as described above, can be concave, e.g., parabolic, and/or adjustable so that the mirror 110 is configured to reflect solar radiation onto the receiver 102. The second mirror 150 is also concave and configured to reflect solar radiation toward the receiver 102. For example, the second mirror 150 can be parabolic and can define a linear focus that coincides with the receiver 102. The first and second mirrors 110, 150 are typically configured to concentrate and reflect solar radiation received from different directions to the receiver 102. Thus, the second mirror 150 can be rigidly attached to the first mirror 110 such that the mirrors 110, 150 can be rotated between first and second positions. In the first position, shown in FIG. 8, the first mirror 110 is configured to reflect solar radiation onto the receiver 102 to heat the receiver 102. In the second position, shown in FIG. 9, the first and second mirrors 110, 150 are rotated such that the second mirror 150 is configured to direct solar radiation onto the receiver 102.

The second mirror 150 can be smaller than the first mirror 110, can have a different curvature than the first mirror 110, or can be less reflective than the first mirror 110. Therefore, the second mirror 150 is configured to reflect a lesser amount of solar energy onto the receiver 102 than the first mirror 110. Thus, the first and second mirrors 110, 150 can be used to direct different amounts of solar radiation toward the receiver for different modes of heating. More particularly, the first mirror 110 can be used to heat the receiver 102 at a relatively greater rate, i.e., with more thermal energy, and the second mirror 150 can be used to heat the receiver 102 at a relatively lesser rate, i.e., with less thermal energy.

During high power operation with the first mirror 110, no significant thermal energy is typically added to the receiver 102 by the second mirror 150. Similarly, during lower power operation with the second mirror 150, no significant thermal energy is typically added to the receiver 102 by the first mirror 110.

The second mirror 150 can also be adjustable relative to the first mirror 110. For example, the second mirror 150 can be extendable or otherwise adjustably connected to the first mirror 110. Thus, similar to the configuration described above in connection with FIGS. 6 and 7, in which the lens 140 is adjustable to the mirror 110, the second mirror 150 can also be adjustable relative to the first mirror 110 so that the second mirror 150 can be retracted or otherwise stowed, e.g., behind the first mirror 110, when not in use. Preferably, when the second mirror 150 is adjusted to the stowed position, the second mirror 150 does not interfere with the collection and reflection of solar radiation by the first mirror 110 to the receiver 102. Then, when it is desired to use the second mirror 150 for directing solar radiation onto the receiver 102, the second mirror 150 can be adjusted to an extended position using a motor or other actuator. In addition, the first and second mirrors 110, 150 can be adjusted in combination by the motor 120 such that the either of the first or second mirrors 110, 150 is disposed relative the sun 50 to direct solar radiation onto the receiver 102. Advantageously, the retraction of the second mirror 150 can reduce wind loads thereon. Further, the amount of solar energy directed toward the receiver 102 can be "fine tuned" by partially retracting or otherwise adjusting the second mirror 150 relative to the first mirror 110.

FIGS. 10–12 illustrate an embodiment of the present invention in which a lens 160 is used without a mirror to heat the receiver 102 at various rates, e.g., to selectively heat the receiver 102 at first or second rates in response to the same amount of solar radiation. The lens 160 can be a fresnel or other type of lens and can be similar to the lens 140 described above in connection with FIGS. 4–7, e.g., defining grooves 162 on at least one surface thereof. Preferably, the lens 160 is of sufficient size for receiving, concentrating, and directing sufficient solar radiation to provide heat to the receiver 102 at a desired rate. For example, the lens 160 can extend along the length of the receiver 102 and can extend in an arc of about 130° around the receiver 102. For example, the arc defined by the cross-section of the lens 160 can have a width W (FIG. 10) between about 2 and 20 feet. The lens 160 can be supported by a frame 168, which is rotatable or otherwise adjustable relative to the base frame 114.

As illustrated in FIG. 10, the lens 160 can be adjustable to correspond to the relative position of the sun 50. For example, the lens 160 can be supported by the base frame 114 so that the frame 168 or other structure is rotatably adjustable and the lens 160 can be rotated about the receiver 102 by a motor 166 or other actuator. As described above in connection with the other embodiments of the invention, the motor 166 can be controlled by a controller, such as a computer, programmable logic device, or the like. The controller can be pre-programmed to track the sun and to communicate with a sensor or detector that determines the relative position of the apparatus 100 relative to the direction of the sun 50. Thus, the lens 160 can be adjusted continuously so that the solar radiation is directed by the lens 160 onto the receiver 102.

The lens 160 can be adjusted between different positions in which different amounts of solar radiation are directed onto the receiver 102 and, hence, the receiver 102 is heated at different rates. In a first position, the lens 160 is configured to maximize the heating of the receiver 102. For example, the lens 160 can be positioned substantially perpendicular to the propagating direction of the solar radiation, as shown in FIG. 11, so that the solar radiation received by the lens 160 is focused onto the receiver 102. Alternatively, in a second position, as shown in FIG. 12, the lens 160 is positioned at an oblique angle to the propagating direction of the solar radiation. In the second position, only a small portion of the solar radiation is focused on the receiver 102, such that the receiver 102 is heated less effectively than in the first position. Thus, the rate of heating of the receiver 102 can be adjusted by adjusting the position of the lens 160 according to the relative direction of the sun 50. Additionally, the transmitivity of the lens 160 can be reduced in the second position, e.g., by providing a semitransparent coating to a portion of the lens 160.

According to another embodiment of the present invention, the lens 160 is fixed in position and configured to direct solar radiation toward the receiver 102 regardless of the relative position of the sun 50 through a range of relative motion of the sun with respect to the lens 160. For example, as shown in FIGS. 13–15, the lens 160 can extend around the receiver 102, e.g., in a parabolic arc of about 180° around the receiver 102. Thus, the lens 160 can direct solar radiation toward the receiver 102 regardless of the relative position of the sun 60. An adjustable shade 170 can be provided for controlling the amount of solar radiation that is received by the receiver 102, the shade 170 being adjustable between two or more positions. For example, the shade 170 can be rotatably mounted such that the shade 170 can be rotated about the receiver 102 by an actuator 172 such as a motor. In a first position, shown in FIG. 13, the shade 170 does not substantially interfere with the transmission of solar radiation to the receiver 102. In a second position, shown in FIG. 14, the shade 170 is configured between the lens 160 and the receiver 102 and prevents the transmission of solar radiation between the lens 160 and the receiver 102. As shown in FIG. 15, the shade 170 can be rotated to a third position in which the shade 170 is positioned intermediate the first and second positions such that a reduced amount of radiation transmitted through the lens 160 is received by the receiver 102. Thus, by controlling the position of the shade 170, the amount of heating of the receiver 102 can be accurately controlled.

The shade 170 can extend along the length of the lens 160, or multiple shorter shades 170 can be used for each lens 160. In either case, the shade 170 can define an arc that extends at least about as far around the receiver 102 as the lens 160 so that the shade 170 can substantially block solar radiation transmitted through each portion of the lens 160. According to one embodiment of the present invention, the shade 170 can also define one or more semitransparent coatings, slits, holes, or other apertures that allow radiation to pass through the shade 170 so that a reduced and controlled amount of radiation is directed onto the receiver 102 when the shade 170 is positioned between the lens 160 and the receiver 102. For example, the shade 170 can define one or more slits extending longitudinally such that the amount of radiation received through the shade 170 depends on the rotational position of the slit relative to the sun 50.

The shade 170 can be formed to an arc shape, as illustrated, so that the shade 170 can be rotated between the lens 160 and the receiver 102. For example, the shade 170 can be formed of one or more sheets of steel. In addition, the shade 170 can be configured to be disposed proximate to the lens 160, proximate to the receiver 102, or therebetween, when the shade 170 is rotated to a position for blocking solar radiation from reaching the receiver 102. In other embodiments of the invention, the adjustable shade 170 can be used in conjunction with the adjustable lens 160 discussed above in connection with FIGS. 10–12 or with the lenses and mirrors of any of the other embodiments of the present invention. Further, it is understood that the present invention can include one or more of each of the lenses, mirrors, and shades.

Preferably, the apparatus 100 of the present invention is adjustable or otherwise configurable to control the amount of solar radiation that is received by the receiver 102. Thus, during any particular solar condition, the apparatus 100 can be adjusted between first and second modes of operation in which different amounts of solar radiation are received by the receiver 102 and the receiver 102 is thus heated at different rates. The apparatus 100 can be configured to receive a maximum amount of solar radiation in the first mode of operation and a lesser amount of solar radiation in the second mode of operation. Thus, the first mode of operation can be used for heating the receiver 102 and the heat transfer fluid therein during normal operation of the apparatus 100. The second mode of operation can be used to deliver a lesser amount of thermal energy to the receiver 102, e.g., to preheat the receiver 102 before the heat transfer fluid is introduced and circulated, to thaw, or melt, heat transfer fluid that has solidified in the receiver 102, or to otherwise heat the receiver 102 and/or heat transfer fluid at a reduced rate, the purpose of which may be to preclude freezing.

Electrical resistant or other types of heating cable, wire, or tube can optionally be mounted on the sunshade if required as an alternate means of providing heat before circulation, to thaw or melt heat transfer fluid that has solidified in the receiver 102, or to otherwise heat the receiver 102.

Reference will now be made to FIG. 16, which illustrates a solar power system 200 according to one embodiment of the present invention. The solar power system 200 generally includes a fluid circuit 202 connecting at least one of the solar collection apparatuses 100 for circulating a heat transfer fluid therethrough so that the heat transfer fluid is heated in the apparatuses 100. It will be appreciated that the system 200 can define a variety of configurations, FIG. 16 illustrating only one exemplary configuration. The fluid circuit 202 can be formed of a network of pipes, tubes, or other passage-defining components, and the system 200 can include components in addition to those shown, e.g., reservoirs, heat exchangers, valves, and other devices for accommodating and controlling the flow of the heat transfer fluid. For example, one or more pumps 204 can be provided at various positions in the system 200 for fluidly circulating the heat transfer fluid. Valves or other flow regulation devices can be used to control the flow of fluid through the various portions of the fluid circuit 202. Further, the operation of the system 200 can be controlled by a controller, such as the controller 130 described above or an additional computer or other electrical processing device.

Various types of heat transfer fluids can be used with the system 200. According to one embodiment of the invention, the heat transfer fluid is a molten salt and, in particular, a nitrate salt including about 60% sodium nitrate and about 40% potassium nitrate. This nitrate salt is generally useful in a temperature range of about 550° F. to 1100° F. At temperatures below about 450° F., the salt begins to solidify, increasing the resistance to flow. At temperatures above about 1100° F., the salt begins to react chemically to form nitrites, which are generally more corrosive than the nitrate salt. Within the range of 450° F.–1100° F., the nitrate salt generally exists as a single phase, i.e., a liquid, such that density of the fluid is substantially uniform throughout the operation of the system 200. Alternative heat transfer fluids include other liquid salts as well as oils and other fluids. The heat transfer fluids can be selected according to the desired and anticipated temperature variation of the fluid in the system 200.

The fluid is circulated through the circuit 202 from a cold thermal storage tank 230 to the solar collection apparatuses 100. Any number of the solar collection apparatuses 100 can be provided, and the collection apparatuses 100 can be arranged in parallel and/or series configurations so that the heat transfer fluid is heated contemporaneously and/or consecutively in the different apparatuses 100. Each solar collection apparatus 100 is structured to heat the heat transfer fluid circulated therethrough. For example, according to one embodiment of the present invention, the heat transfer fluid enters the solar collection apparatuses 100 at a temperature between about 450° F. and 650° F., such as about 550° F., and exits the collection apparatuses 100 at a temperature between about 950° F. and 1100° F., such as about 1050° F.

The system 200 can also include additional heating devices such as one or more tower solar absorption device (not shown). For example, the tower solar absorption devices can be structured receive the heat transfer fluid from the trough-type solar collection apparatuses 100 and heat the fluid more efficiently to a temperature higher than the temperature of the fluid in the solar collection apparatuses 100. Systems and methods for heating fluid according to such a two-stage operation are described in U.S. application Ser. No. 10/732,495, entitled "Solar Power System and Method for Power Generation," filed concurrently herewith, assigned to the assignee of the present application, and the contents of which is incorporated herein in its entirety by reference.

The heat transfer fluid flows from the solar collection apparatuses 100 to a hot thermal storage tank 250 and/or to a power generator 260. The power generator 260 can include a variety of devices for removing or otherwise using the thermal energy of the heat transfer fluid. For example, the power generator 260 can be a conventional steam generator for transferring thermal energy from the heat transfer fluid to a separate fluid circuit holding water to thereby generate steam from the water. The steam can be delivered to a turbine 262 to rotate the turbine 262 and an electrical generator 264 coupled to the turbine 262. A condenser 266 and cooling tower 268 can be used to condense and cool the steam prior to preheat of water in preheater 267 and recirculation by pump 270, as is known to those skilled in the art. Thus, the thermal energy of the heat transfer fluid can be converted to electrical energy that can be transmitted and distributed, e.g., by conventional electrical transmission devices and a distribution grid. In some embodiments, the temperature of the fluid is increased to about 1050° F. by the solar collection apparatuses 100, the water/steam is heated to about 1050° F. by the power generator 260, and the water/steam is then cooled to about 550° F. in a conventional turbine that generates electricity with an efficiency of about 40%. Alternatively, the power generator 260 can be a heat exchanging device that generates a hot working fluid, such as steam, that can be delivered for heating purposes, such as for heating buildings or for industrial process heating. For example, the steam can be used as a heat source for conventional manufacturing processes or for water desalination.

The heat transfer fluid is cooled in the power generator 260 and pumped to the cold storage tank 230 and the heat transfer fluid entering the solar collection apparatuses 100, e.g., between about 450° F. and 650° F. such as about 550° F. The heat transfer fluid can be circulated back to the cold thermal storage tank 230 and/or recirculated through the solar collection apparatuses 100. In some embodiments, the heat transfer fluid is delivered from the power generator 260 to the solar collection apparatuses 100 without passing through the cold thermal storage tank 230 so that the heat transfer fluid can be reheated immediately. In other embodiments, the heat transfer fluid can be stored in the cold thermal storage tank 230 before being reheated and recirculated though the system 200.

Generally, the system 200 can be operated with or without each of the thermal fluid storage tanks 230, 250. If one or more of the fluid tanks 230, 250 are included in the system 200, each tank 230, 250 can be insulated to minimize thermal losses to the environment. Some thermal energy will likely be lost to the environment, though it is expected that the change in the temperature of the fluid due to such losses will be minimal unless the fluid is stored for extended periods of time. In one embodiment of the present invention, the heat transfer fluid is heated and delivered to the hot storage tank 250 and stored in the tank 250 for subsequent power generation or reheating. For example, if sufficient solar radiation is available for heating fluid in the solar collection apparatuses 100, the fluid can be heated and stored and/or used in the power generator 260. If the solar collection apparatuses 100 heat more fluid than that which can be accommodated by the power generator 260, some of the fluid can be directed from the solar collection apparatuses 100 to the hot thermal storage tank 250. Similarly, if the solar collection apparatuses 100 heat more fluid than that which is necessary for generating the desired amount of power in the power generator 260, the excess fluid can be stored in the tank 250. Subsequently, if the solar collection apparatuses 100 are unable to heat sufficient fluid for generating the desired power in the power generator 260, the hot fluid from the storage tank 250 can be delivered to the generator 260. Thus, the hot storage tank 250 allows the timing of power generation to be shifted from the time of the absorption of solar energy, thereby allowing power to be generated during night or other periods of relative darkness, during maintenance of the system components, and the like. Additionally, power can be generated according to the need for or current market value of electricity, or according to other factors.

The cold thermal storage tank 230 can also be used to receive fluid from the power generator 260 even if the solar collection apparatuses 100 are not being operated. For example, if heat transfer fluid from the hot thermal storage tank 250 is used for operation of the power generator 260 when the solar collection apparatuses 100 are not operated, such as at night or during maintenance of the devices, as described above, the fluid can be delivered from the power generator 260 to the cold thermal storage tank 230.

Thus, the operation of the power generator 260 need not be restricted to those times when solar energy is available for heating the fluid. Therefore, the system 200 is characterized by improved dispatchability, i.e., increased flexibility to dispatch power therefrom according to a desired schedule. In some embodiments, the solar collection apparatuses 100 have sufficient capacity to heat enough fluid during a daytime when solar energy is available such that the fluid can be used to operate the power generator 260 during nighttime when solar energy is not available. Thus, the system 200 can be operated continuously during daytime and nighttime. In other embodiments, the power generator 260 can be operated to generate power when power is required or when power prices are high, and operation can be slowed or stopped when power is not needed or when power prices are low. For example, the system 200 can operate to heat the fluid according to the availability of sunlight, with power being generated according to a current or anticipated desire for or market value of electricity.

If there is insufficient solar radiation for heating the heat transfer fluid in the solar collection apparatuses 100, such as at night or other times of darkness, the fluid can continue to circulate through the devices or the fluid can be drained therefrom. For example, the heat transfer fluid can be drained from the solar collection apparatuses 100 to the hot thermal storage tank 250 and/or the cold thermal storage tank 230. Depending on the size and configuration of the solar collection apparatuses 100, the fluid can be drained within a relatively short time, e.g., within a few minutes in some embodiments. The solar collection apparatuses 100 can also be drained at other times when the solar collection apparatuses 100 are not heating the fluid, such as during times of maintenance and the like.

If the heat transfer fluid is drained from the solar collection apparatuses 100, the solar receivers 102 can subsequently be preheated before the circulation of the fluid is restarted. For example, the solar collection apparatuses 100 can be adjusted to the second mode of operation in which a controlled amount of solar radiation is directed onto the receivers 102, thereby heating the receivers 102 at a controlled rate. Thermocouples 210 or other temperature sensing devices can be provided for detecting the temperature of the receivers 102. For example, as shown in FIG. 16, thermocouples 210 can be provided on each solar receiver 102 so that each thermocouple 210 is configured to detect the temperature of the receiver 102. Each thermocouple 210 can electrically communicate with a controller, such as controller 130, that responds to changes in temperature by controlling the configuration of one or more of the solar collection apparatuses 100 according to the desired amount of heating for the respective receiver 102. For example, if the receiver 102 of a particular solar collection apparatus 100 is cooler than the desired temperature for the receiver 102, the controller 130 can increase the heating rate of the solar collection apparatus 100 by adjusting the mirror, lens, and/or shade thereof. Alternatively, if the receiver 102 is warmer than the desired temperature, the controller 130 can decrease the heating rate by adjusting the mirror, lens, and/or shade. In some cases, the receivers 102 can be preheated in a substantially empty condition to a temperature that is approximately equal to the temperature of the heat transfer fluid that is subsequently circulated therethrough. Thus, the heat transfer fluid can be introduced into the receivers 102 without causing a rapid thermal change and associated stress in the receivers 102.

In other embodiments of the invention, the fluid can continue to circulate through the receivers 102 during periods when the solar collection apparatuses 100 are not heating the fluid or not substantially heating the fluid. For example, if solar radiation is not available due to nighttime and/or clouding or other weather or atmospheric conditions, the circulation of fluid can be continued until solar radiation is again available or a decision is made to interrupt operation. Heaters can be provided for heating the fluid in the storage tanks 230, 250, solar collection apparatuses 100, or other system components to maintain minimum operating temperatures throughout the system 200. If the fluid becomes cooler than a solidification temperature, the fluid will begin to solidify, or freeze, in the apparatuses 100. In some cases, the solidification of the fluid can continue until the passages 104 of the receivers 102 are blocked and the circulation of the fluid therethrough cannot be continued. The fluid can be melted by heating the receivers 102 when sufficient solar radiation is available. Preferably, the heating rate of the receivers 102 is controlled during melting of the fluid, e.g., by the controller 130 and in response to the temperature as measured by the thermocouples 210, which measure the temperature of the receivers 102 and, hence, the heat transfer fluid therein.

The receivers 102 can be controllably heated during preheating and while melting fluid therein. Further, the heating rate of each receiver 102 can be coordinated with the receivers 102 of the other solar collection apparatuses 100 so that the fluid is heated throughout the system 200 at a controlled rate, e.g., uniformly and/or according to a predetermined rate or schedule. Thus, thermal stresses caused by nonuniform heating can be minimized, and the receivers 102 can be heated accurately to a desired temperature.

The operations for generating power using solar energy according to one embodiment of the present invention are illustrated in FIG. 17. It is understood that some of the illustrated operations can be omitted from the method and additional operations can be performed without departing from the scope of this invention. Beginning at Block 300, it is determined if the receiver of the solar collection apparatus is substantially empty of the heat transfer fluid. If the receiver is substantially empty, it is next determined at Block 302 if the receiver requires preheating. If preheating is required, the solar collection apparatus is adjusted to a second position in which one or more mirrors and/or lenses are configured to direct solar radiation toward the receiver and thereby heat the receiver at a second rate. See Block 304. For example, one or more mirrors, lenses, and/or shades can be adjusted to direct the different amounts of solar radiation toward the receiver such that the receiver is heated to a preheat temperature before the fluid is circulated therethrough. If the receiver does not require preheating, e.g., if the receiver is sufficiently warm to receive heat transfer fluid, the heat transfer fluid is circulated through a passage defined by the receiver, and the solar collection apparatus is adjusted to a first position in which one or more of the mirrors and/or lenses are configured to direct solar radiation toward the receiver to heat the receiver at a first rate, higher than the second rate. See Block 310. Returning to Block 300, if it is determined that the receiver is not substantially empty of the heat transfer fluid, it is next determined if the fluid in the receiver is at least partially solidified. See Block 306. If the fluid is at least partially solidified, the solar collection apparatus is adjusted to the second position to melt the heat transfer fluid. See Block 308. Alternatively, if the heat transfer fluid is not solidified in the receiver, e.g., if the fluid has been melted, the heat transfer fluid is circulated as indicated by Block 310. Further, the heat transfer fluid that is heated in the receiver can then be delivered to a power generator such as a steam generator and electrical generator. See Block 312.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for collecting solar energy, the apparatus comprising:
   a receiver extending along an axis and defining a passage for receiving a heat transfer fluid;
   an optical lens configured to direct solar radiation toward the receiver; and
   a concave mirror positioned adjacent the lens, the mirror being configured to receive solar radiation not passing through the lens and reflect the solar radiation toward the receiver,
   wherein the mirror and lens are configured to direct different amounts of solar radiation toward the receiver and thereby heat the receiver at first and second rates, respectively, during similar solar conditions.

2. An apparatus according to claim 1 wherein the mirror is parabolic and configured to reflect solar energy toward the receiver.

3. An apparatus according to claim 1 wherein the mirror is rotatable about the axis of the receiver such that the mirror can receive solar radiation from various directions and direct the solar radiation toward the receiver.

4. An apparatus according to claim 1 wherein the lens is adjustably supported relative to the mirror.

5. An apparatus according to claim 1 wherein the lens and mirror are rigidly attached.

6. An apparatus according to claim 1 wherein the lens is a fresnel lens structured to at least partially refract light passing therethrough.

7. An apparatus according to claim 1, further comprising a drive mechanism for adjusting the lens relative to the mirror.

8. An apparatus according to claim 1 wherein the mirror is configured to direct a greater amount of solar radiation toward the receiver than the lens during similar solar conditions.

9. An apparatus for collecting solar energy, the apparatus comprising:
   a receiver extending along an axis and defining a passage for receiving a heat transfer fluid;
   a concave mirror configured to reflect solar radiation toward the receiver; and
   an optical lens positioned adjacent the mirror, the lens being configured to direct solar radiation to the receiver,
   wherein at least one of the mirror and lens is adjustably supported and thereby configured to adjust between first and second positions, the mirror in the first position being configured to receive a first amount of solar radiation not passing through the lens and direct the solar radiation toward the receiver, and the lens in the second position being configured to direct a second amount of solar radiation toward the receiver, the first and second amounts of solar radiation being different such that the mirror and lens are adapted to selectively heat the receiver at first and second rates during similar solar conditions.

10. An apparatus according to claim 9 wherein the mirror is parabolic and configured to reflect solar energy toward the receiver.

11. An apparatus according to claim 9 wherein the mirror is rotatable about the axis of the receiver such that the mirror can receive solar radiation from various directions and direct the solar radiation toward the receiver.

12. An apparatus according to claim 9 wherein the lens is adjustable relative to the mirror.

13. An apparatus according to claim 9 wherein the lens and mirror are rigidly attached.

14. An apparatus according to claim 9 wherein the lens is a fresnel lens structured to at least partially refract light passing therethrough.

15. An apparatus according to claim 9 wherein the mirror and lens extend along the axis of the receiver generally parallel to the receiver.

16. An apparatus according to claim 9 wherein the mirror and lens are independently adjustable about the axis of the receiver.

17. An apparatus according to claim 9, further comprising a drive mechanism for adjusting the lens relative to the mirror.

* * * * *

UNITED STATES PATENT AND TRADEMARK OFFICE
CERTIFICATE OF CORRECTION

PATENT NO. : 7,055,519 B2
APPLICATION NO. : 10/731951
DATED : June 6, 2006
INVENTOR(S) : Litwin It is certified that error appears in the above-identified patent and that said Letters Patent is hereby corrected as shown below:

<u>Column 14,</u>

Line 24, "minor" should read --mirror--.

Signed and Sealed this

Fifth Day of December, 2006

JON W. DUDAS
*Director of the United States Patent and Trademark Office*